(12) United States Patent
Butler (10) Patent No.: US 11,080,987 B2
(45) Date of Patent: Aug. 3, 2021

(54) AUTOMATIC THREAT IDENTIFICATION AND RESPONSE SYSTEM

(71) Applicant: BearCom Group, Inc., Garland, TX (US)

(72) Inventor: Michael Butler, Arlington, TX (US)

(73) Assignee: BEARCOM GROUP, INC., Garland, TX (US)

(*) Notice: Subject to any disclaimer, the term of this patent is extended or adjusted under 35 U.S.C. 154(b) by 0 days.

(21) Appl. No.: 16/899,410

(22) Filed: Jun. 11, 2020

(65) Prior Publication Data

US 2020/0394897 A1    Dec. 17, 2020

Related U.S. Application Data

(60) Provisional application No. 62/861,768, filed on Jun. 14, 2019.

(51) Int. Cl.
| | | |
|---|---|---|
| G08B 27/00 | (2006.01) |
| G06K 9/00 | (2006.01) |
| G08B 25/01 | (2006.01) |
| G08B 25/10 | (2006.01) |
| G08B 26/00 | (2006.01) |

(52) U.S. Cl.
CPC ....... *G08B 27/001* (2013.01); *G06K 9/00718* (2013.01); *G08B 25/012* (2013.01); *G08B 25/016* (2013.01); *G08B 25/10* (2013.01); *G08B 26/007* (2013.01); *G08B 27/005* (2013.01); *G08B 27/006* (2013.01)

(58) Field of Classification Search
CPC .. G08B 27/001; G08B 25/012; G08B 25/016; G08B 25/10; G08B 26/007; G08B 27/005; G08B 27/006; G06K 9/00718; G06K 9/00771
USPC ......................................................... 340/506
See application file for complete search history.

(56) References Cited

U.S. PATENT DOCUMENTS

| | | | | |
|---|---|---|---|---|
| 8,274,377 | B2* | 9/2012 | Smith | G08B 27/001 340/286.02 |
| 9,027,125 | B2* | 5/2015 | Kumar | G06F 21/52 726/22 |
| 9,965,936 | B1* | 5/2018 | Epps | G08B 21/02 |
| 10,375,558 | B2* | 8/2019 | Katz | H04M 3/42161 |
| 10,559,180 | B2* | 2/2020 | Pourmohammad | G06N 5/022 |
| 10,565,844 | B2* | 2/2020 | Pourmohammad | G06N 20/00 |
| 10,706,701 | B2* | 7/2020 | Beiser | H04N 7/181 |

* cited by examiner

*Primary Examiner* — John A Tweel, Jr.
(74) *Attorney, Agent, or Firm* — Jeffer Mangels Butler & Mitchell LLP; Brennan C. Swain, Esq.

(57) ABSTRACT

A system and method provides for automatic threat identification and response. The system and method detects a first incident and classifies the incident. In response to the classification of the incident, a first human readable indication corresponding to the classification of the incident is transmitted over a communication channel.

11 Claims, 6 Drawing Sheets

AUTOMATIC THREAT IDENTIFICATION AND RESPONSE SYSTEM

CROSS-REFERENCE TO RELATED APPLICATIONS

This application claims the benefit of U.S. Provisional Application No. 62/861,768, filed on Jun. 14, 2019, the entirety of which is incorporated by reference herein.

FIELD OF THE INVENTION

This application relates generally to automation and more particularly to systems and methods for automatic threat identification and response.

BACKGROUND OF THE INVENTION

Closed-circuit television systems and security systems having cameras have become prevalent in both private security and law enforcement contexts. However, challenges arise relating to real-time video monitoring by dispatchers who often must simultaneously monitor multiple video feeds and assess each video feed for different potential threats. For example, a dispatcher monitoring a video feed of a roadway may be tasked with identifying unauthorized or wrong way traffic and at the same time may be monitoring a video feed of an industrial area and tasked with identifying any human movement in closed industrial areas while ignoring machinery movement. Moreover, certain threat patterns are not human ascertainable, such as the automatic identification of vehicles, and certain responsive actions are not able to be completed by humans. For instance, certain threats necessitate 24/7/365 monitoring and instantaneous or near instantaneous response to each and every possible identified threat. Thus, there remains a need for an automatic threat identification and response system.

SUMMARY OF THE PREFERRED EMBODIMENTS

A method of automatic threat identification and response is provided. The method may include detecting, by a first anomaly detection module, a first incident in an environment, wherein the first anomaly detection module is operatively coupled to a security system controller, classifying, by an anomaly detection supervisor of the security system controller, the first incident, and generating, by the anomaly detection supervisor a first characterization token in response to the classifying of the first incident. The method may include receiving, by an automatic dispatch command generator of the security system controller, the first characterization token, generating, by the automatic dispatch command generator, a first human readable indication corresponding to the first characterization token, and transmitting, by the automatic dispatch command generator, the first human readable indication to an automatic dispatch interface module. The method may also include receiving, by the automatic dispatch interface module, the first human readable indication and providing, by the automatic dispatch interface module, the first human readable indication to a dispatch endpoint configured to transmit a signal over a communication channel, the signal representing the first human readable indication. In various embodiments, a first portable device remotely disposed from the dispatch endpoint is configured to receive the signal from the communication channel and reproduce the first human readable indication in human readable form.

An automatic threat identification and response system is provided. The system may include a first anomaly detection module configured to detect a first incident in an environment. The system may include a security system controller operatively coupled to the first anomaly detection module. The security system controller may include an anomaly detection supervisor configured to classify the first incident and generate a first characterization token representative of a classification of the first incident. The security system controller may include an automatic dispatch command generator configured to: (i) receive the first characterization token, (ii) generate a first human readable indication corresponding to the first characterization token, and (iii) transmit the first human readable indication to an automatic dispatch interface module. The automatic dispatch interface module may be an interface configured to receive the first human readable indication and provide the first human readable indication to a dispatch endpoint. The dispatch endpoint may be a transmitter configured to transmit a signal over a communication channel, the signal representing the first human readable indication. In various embodiments, a first portable device remotely disposed from the dispatch endpoint is configured to receive the signal from the communication channel and reproduce the first human readable indication in human readable form.

An automatic dispatch interface module is provided. The module may be configured to receive a first human readable indication that is an audio signal and configured to provide the first human readable indication to a dispatch endpoint that is a radio transmitter. The automatic dispatch interface module may include an audio input interface configured to match an impedance of an audio source and receive an audio signal from the audio source. The automatic dispatch interface module may include a level converter configured to receive the audio signal from the audio input interface and at least one of amplify and filter the audio signal. The automatic dispatch interface module may include an audio output interface configured to match an impedance of an audio input of the radio transmitter and provide the audio signal from the level converter to the radio transmitter.

BRIEF DESCRIPTION OF THE DRAWINGS

For a more complete understanding of the disclosure, reference should be made to the following detailed description and accompanying drawings wherein.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Skilled artisans will appreciate that elements in the figures are illustrated for simplicity and clarity. It will further be appreciated that certain actions, blocks, and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

Video surveillance technology has become ubiquitous. However, unattended video surveillance, while capturing and recording threats, provides no facility for triggering responses to the threats, decreasing the utility of such systems and allowing harm to life and property to occur. In addition, in many contexts, it is physically impossible to rely on a manual dispatcher to monitor video surveillance and manually actuate a radio transceiver to dispatch law enforcement officers or private security officers due to the volume of potential threats to be monitored for. A need for 24/7/365 monitoring of different video feeds for many different threats and need for instantaneous or near instantaneous response to an identified threat renders manual monitoring of threats and dispatching of responders by a human dispatcher impossible. In addition, many contexts require that threats invisible to human observers be detected and responses at rates physically impossible for human dispatchers be provided. For instance, malfunctioning machinery may be identified and immediately shut down by the automatic threat identification and response system provided herein. Threats such as an incipient machinery failure may be invisible to a human eye and may require response times exceeding that of human ability. Thus, an automated system and method provides a machine solution to these many challenges.

Figure 1:
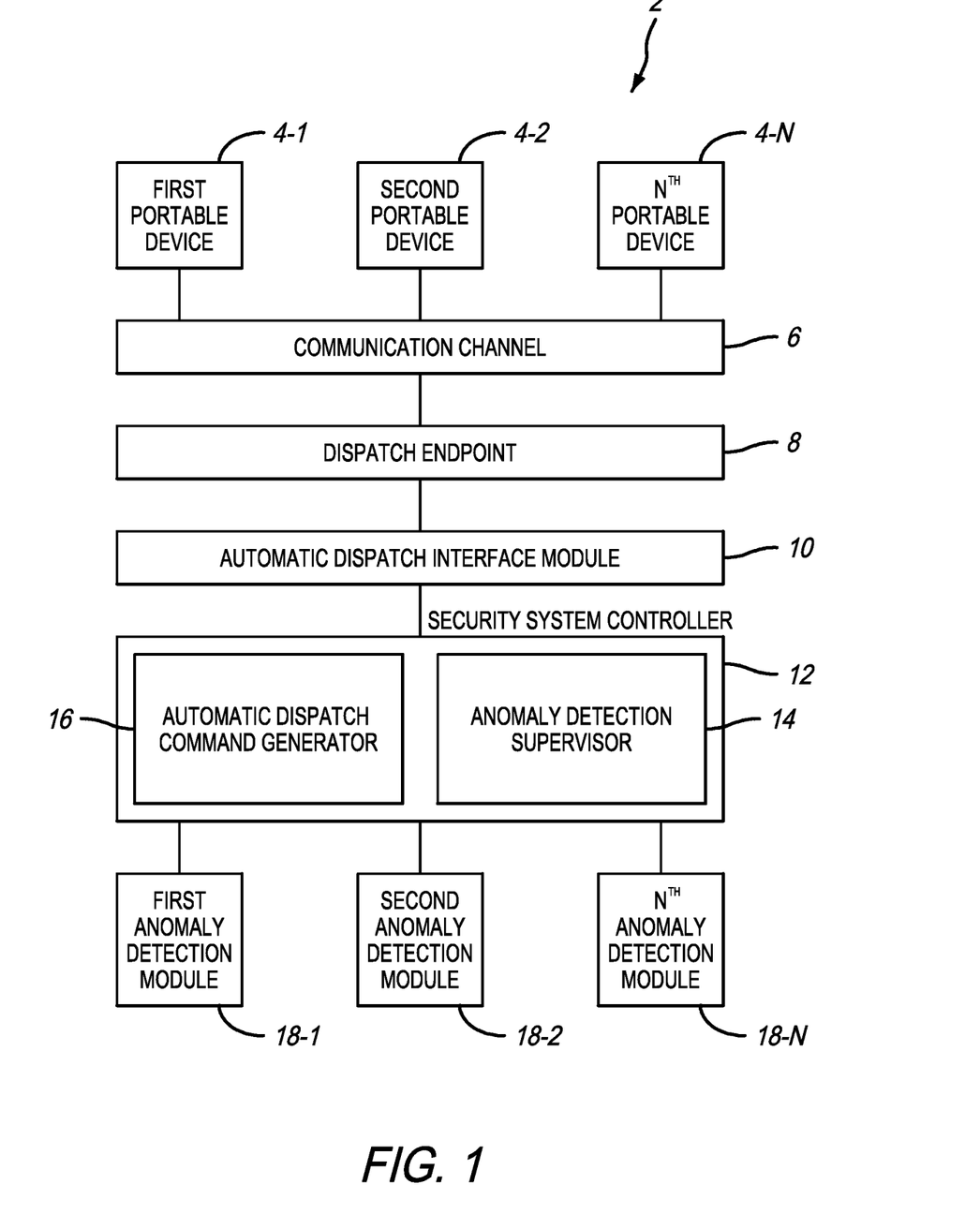
FIG. 1 depicts a block diagram of an example automatic threat identification and response system, in accordance with various embodiments.
Figure 2:
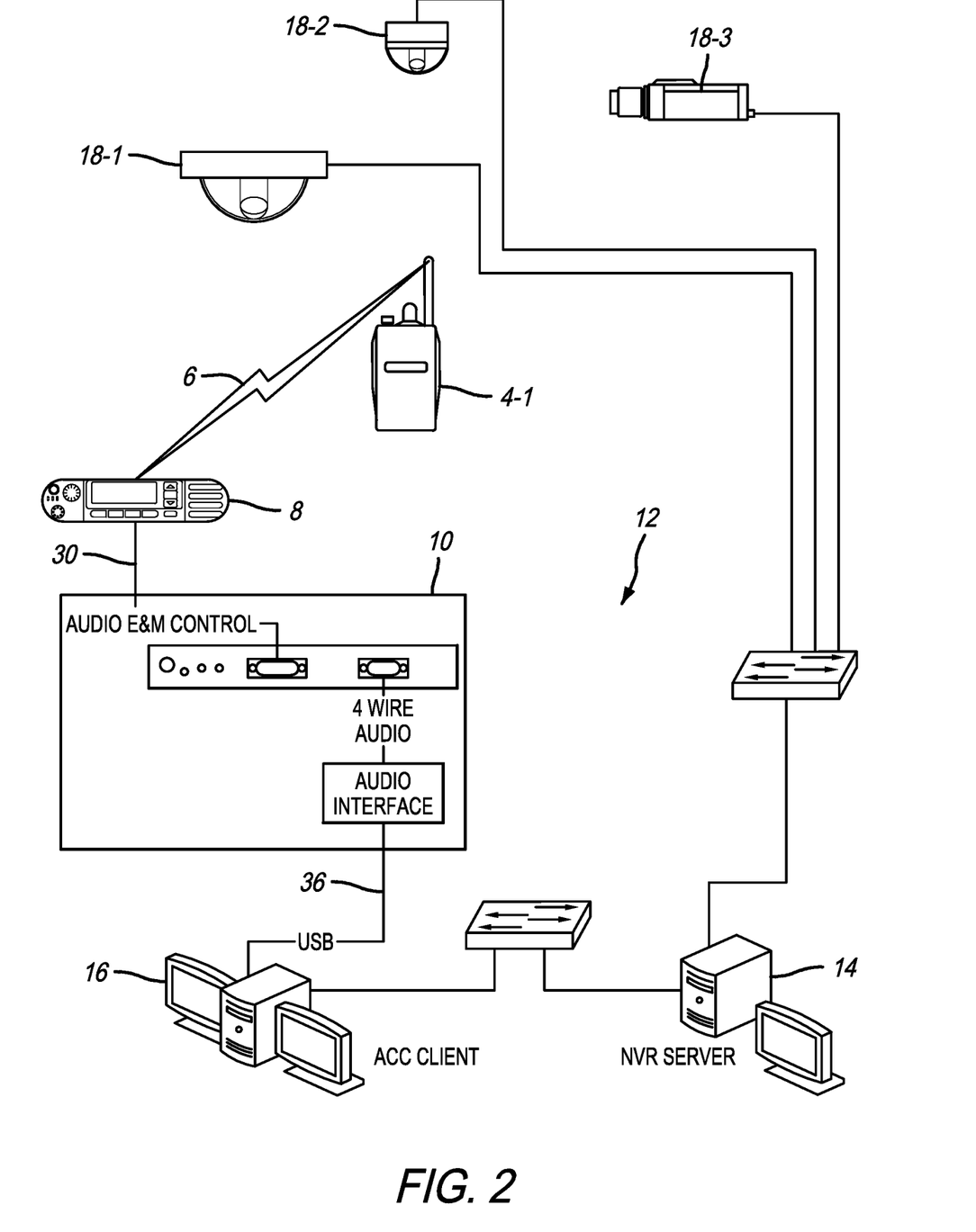
FIG. 2 depicts a practical embodiment of an automatic threat identification and response system, in accordance to various embodiments.

With reference to FIGS. 1 and 2, an automatic threat identification and response system 2 is provided. In various instances, such a system has integrated video analytic features to identify and classify patterns in images and/or videos. For instance the system may perform object detection and classification of object behavior. This may include differentiation between people and vehicles, motion detection, direction detection, identification of the types of motion, and the like so that threats may be identified within an environment under surveillance. Systems and methods of automatic threat identification and response disclosed herein are capable of real-time analytics, and may also transmit an audio alarm directly to responsive personnel via a communication channel. The audio alarm may include human readable information that characterizes the nature of a potential threat, facilitating improved responses.

The automatic threat identification and response system 2 may include one or more anomaly detection modules. For example, a first anomaly detection module 18-1, a second anomaly detection module 18-2, and any number, N, of anomaly detection modules, such as an Nth anomaly detection module 18-N may be provided. An anomaly detection module may comprise any sensor configured to monitor characteristics of an environment so that unexpected changes in these characteristics can be identified and a proper response triggered. For instance, an anomaly detection module may comprise a camera. The camera may be a video camera. The camera may be a high-speed camera. The camera may be an infrared or other camera monitoring invisible emissions. The camera may monitor an environment to detect a first incident in the environment. The first incident may include undesired entry of people and/or vehicles into an environment, motion detection, direction detection, identification of the types of motion, changes in repetitive motions suggestive of a machinery failure, and the like that corresponds to one or more rules and/or heuristics.

While cameras are discussed herein, further anomaly detection modules may include any variety of sensor. For instance, example modules may include infrared sensors, temperature sensors, pressure sensors, humidity sensors, fire detectors, smoke detectors, vibration sensors, fluidic sensors (pressure, presence, volume, etc.), ultrasonic sensors, radiation sensors, and/or any sensor as desired.

The automatic threat identification and response system 2 may include a security system controller 12 operatively connected to the anomaly detection module(s). A security system controller 12 may comprise a computer having a processor and memory loaded with software. The security system controller 12 may comprise a microcontroller, FPGA, ASIC, and/or any other processing mechanism as desired. In further instances, the security system controller 12 comprises a distributed cloud-based software service operative on remotely disposed processors and/or memories.

The security system controller 12 monitors data provided by the anomaly detection modules and classifies the incidents detected by the sensors. For example, the security system controller 12 may include an anomaly detection supervisor 14. The anomaly detection supervisor 14 is a logical aspect of the security system controller 12, though in further instances, the anomaly detection supervisor 14 may comprise specialized hardware. For example, the anomaly detection supervisor 14 may comprise a computer having a processor and memory loaded with software. The anomaly detection supervisor 14 receives data from the anomaly detection modules and processes that data based on rules and/or heuristics in order to classify the detected incident. For example, the anomaly detection supervisor 14 may classify the incident as being an undesired entry of people, undesired entry of vehicle, motion inconsistent with a rule, presence of motion, absence of motion, motion consistent with an approved direction of movement, motion inconsistent with an approved direction of movement, characterization of motion (e.g., linear, turning, spinning, rolling, bouncing, vibrating, etc.), and/or the like.

The anomaly detection supervisor 14 generates a first characterization token corresponding to the classification of the motion. For example, a bit, byte, or plurality of bytes may be generated that identify the classification of the incident may be generated. This first characterization token is generated by the anomaly detection supervisor 14 in response to the classifying of the first incident and is provided to a further aspect of the security system controller 12—specifically an automatic dispatch command generator 16. While the term "token" is used throughout, one may appreciate that the first characterization token may be any mechanism of electronic communication between aspects of an electronic system. For instance, a flag or interrupt are just two further examples of a possible first characterization token.

An automatic dispatch command generator 16 comprises a further logical aspect of the security system controller 12, though in further instances, the automatic dispatch command generator 16 may comprise specialized hardware. For example, in various embodiments, the automatic dispatch command generator 16 comprises a computer separate from the anomaly detection supervisor 14 and having a processor and memory loaded with software. The automatic dispatch command generator 16 receives the first characterization token from the anomaly detection supervisor 14 and generates a first human readable indication corresponding to the first characterization token. For example, the automatic dispatch command generator 16 may compare the first characterization token to a list of possible tokens. Each such possible token may be associated with a different stored sound file. The automatic dispatch command generator 16 may find a match between the first characterization token and a matching token in the list, and may retrieve the stored sound file that is associated with that token. In this manner, the automatic dispatch command generator 16 may provide a human readable output that will explain to a human one or more feature of the first incident. The automatic dispatch command generator 16 comprises an output, such as a data bus, an analog electrical connection, a digital data connection, or the like, whereby the human readable output is transmitted from the automatic dispatch command generator 16 to an automatic dispatch interface module 10.

While reference is made to a sound file as the human readable indication, in various embodiments, the human readable indication may comprise text, or graphical indications such as diagrams or maps. The human readable indication may comprise tactile indications such as vibrations, braille, or any other mechanism whereby information can be conveyed to a human. Additionally, while human readable output is discussed throughout this disclosure, one may also appreciate that the output may be a machine command, such as a specialized API call to a controller of industrial machinery to change the operation of the industrial machinery. For example, the output may be a machine command to shut down a malfunctioning machine or otherwise correct a fault condition of an operating machine.

Having completed the discussion of the security system controller 12 and constituent modules of the security system controller 12 (e.g., the automatic dispatch command generator 16 and the anomaly detection supervisor 14), attention is directed again to the automatic threat identification and response system 2, which further comprises an automatic dispatch interface module 10. The automatic dispatch interface module 10 comprises an interface device that connects the security system controller 12 to a dispatch endpoint 8 so that data and/or signals representative of the human readable indication may be received from the automatic dispatch command generator 16 by the automatic dispatch interface module 10 and then provided to a dispatch endpoint 8. The automatic dispatch interface module 10 comprises various circuits to facilitate this interconnection. These various aspects will be discussed in detail with reference to FIG. 3 in a later portion of this disclosure.

The automatic threat identification and response system 2 may include a dispatch endpoint 8. The dispatch endpoint 8 may comprise any transmitter or transceiver configured to send a signal to a remotely disposed receiver, instructing a user of the remotely disposed receiver of the presence of the first incident. For example, the dispatch endpoint 8 may comprise a radio transmitter. The dispatch endpoint 8 may receive the first human readable indication from the automatic dispatch interface module 10 and may transmit a signal over a communication channel 6 that represents the first human readable indication. A first portable device remotely disposed from the dispatch endpoint 8 may receive the signal from the communication channel 6 and reproduce the first human readable indication in human readable form.

The dispatch endpoint 8 may be sound activated. For instance, a voice-activated (VOX) circuit may control the keying of the transceiver. Consequently, the dispatch endpoint 8 may automatically "key up" (e.g., begin transmitting) upon provision by the automatic dispatch interface module 10 of the first human readable indication. In further instances, the dispatch endpoint 8 is not voice-activated, and the automatic dispatch interface module 10 separately triggers the dispatch endpoint 8 to transmit at least partially coincident with also providing human readable indication to the dispatch endpoint 8. In yet further instances, the dispatch endpoint 8 is not voice-activated, and the automatic dispatch interface module 10 separately triggers the dispatch endpoint 8 to transmit following the loading of the human readable indication into a buffer of the dispatch endpoint 8.

The communication channel 6 may be a radio frequency associated with a public safety radio system. In various instances, the communication channel 6 includes a repeater. The communication channel 6 may further comprise a logical channel, such as in connection with a trunked radio system, or a packet-based communication network, or may comprise any further medium of conveying information.

One or more portable devices may be disposed remotely from the dispatch endpoint 8. For example, a first portable device 4-1, a second portable device 4-2, and any number, N, of portable devices, such as an Nth portable device 4-N may be included. In various embodiments, a portable devices comprises a radio receiver. In various embodiments, a portable devices comprises a portable transceiver such as a handi-talkie or a vehicle-mounted transceiver. One or more portable device, such as the first portable device 4-1, is remotely disposed from the dispatch endpoint 8 and is configured to receive the signal from the communication channel 6 and reproduce the first human readable indication in a human readable form. For instance, the first portable device 4-1 may receive the radio transmission provided over the communication channel 6 by the dispatch endpoint 8 and demodulate the radio transmission to recover sounds in a human readable form so that a human may listen to speech relating to the first incident. The portable device may be operated by a law enforcement officer and the law enforcement officer may respond to the first incident based on the human readable communications received by the portable device. In further instances, the portable device is a radio receiver of a remotely disposed machinery. For instance, the radio receiver may be associated with machinery and may receive instructions that cause the machinery to stop operating or otherwise correct a fault condition of the machinery.

Figure 3:
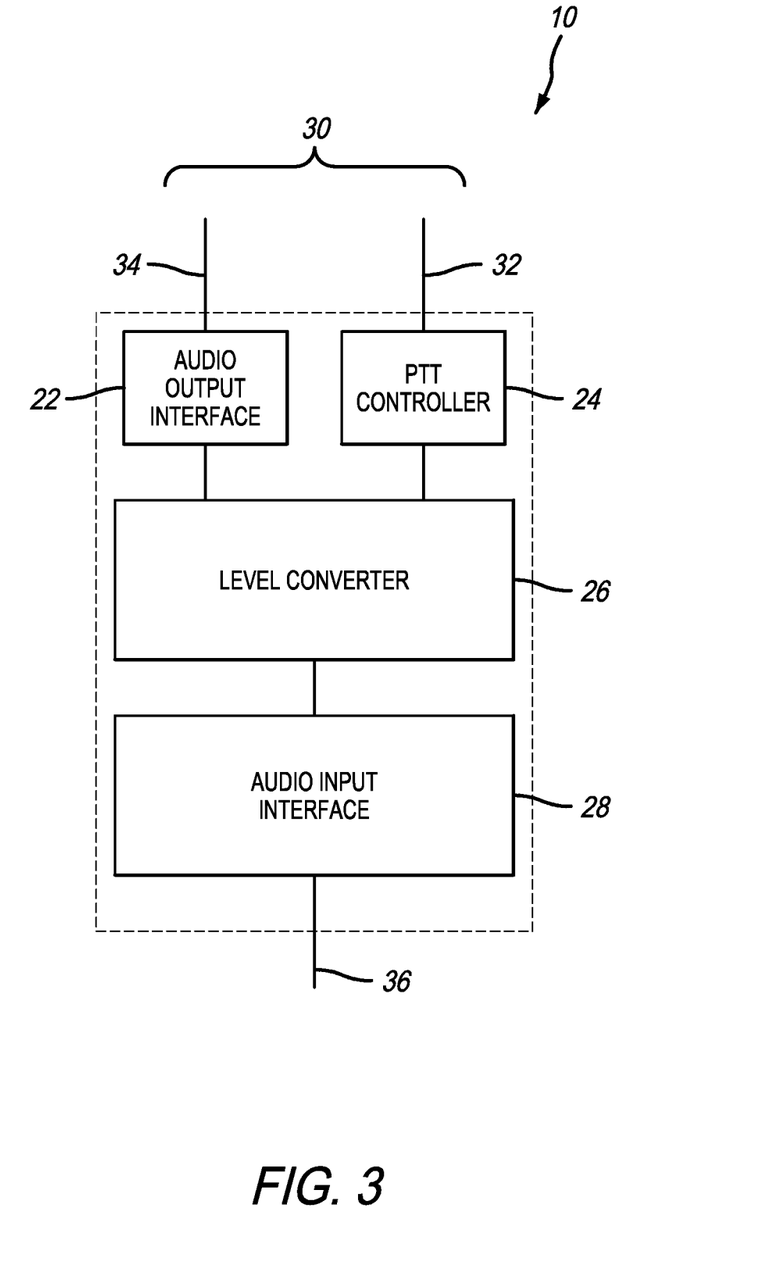
FIG. 3 depicts an example automatic dispatch interface module of an automatic threat identification and response system, in accordance with various embodiments.

Directing attention now to FIG. 3, the automatic dispatch interface module 10 is illustrated in detail. The automatic dispatch interface module 10 interconnects the security system controller 12 to the dispatch endpoint 8. Depending on the specific embodiment of security system controller 12 and specific embodiment of dispatch endpoint 8 that is implemented, one or more of the various aspects of the automatic dispatch interface module 10 may be omitted. The automatic dispatch interface module 10 is connected via input 36 to the security system controller 12. In various embodiments, input 36 comprises a USB connection, though any other mechanism of providing data or signals representative of the first human readable indication may be implemented. In various instances, the input 36 receives an audio signal. The audio signal or other mechanism of providing data or signals representative of the first human readable indication are conducted from the input 36 to an audio input interface 28. An audio input interface 28 facilitates the transfer of the input signal or data to the automatic dispatch interface module 10. For example, the audio input interface 28 may comprise one or more electronic component configured to match an impedance of an audio source (e.g., the security system controller 12 and/or other front end components of input 36) and receive an audio signal from the audio source. The automatic dispatch interface module 10 may further include a level converter 26. For instance, the dispatch endpoint 8 may require an input audio signal having different specifications that that received by input 36. The level converter 26 comprises an amplifier configured to appropriately adjust the specifications of the input audio signal. For instance, the level converter 26 may receive the audio signal from the audio input interface 28 and at least one of amplify and filter the audio signal. The audio signal or other mechanism of providing data or signals representative of the first human readable indication is conducted from the level converter 26 to an audio output interface 22. An audio output interface 22 facilitates the transfer of the audio signal or data to the dispatch endpoint 8 via an automatic dispatch interface module output 30. For example, the audio output interface 22 may comprise one or more electronic component configured to match an impedance of an audio input of the dispatch endpoint 8 (e.g., the security system controller 12 and/or other front end components of input 36) and transmit an audio signal to the dispatch endpoint 8. Thus, one may appreciate that the automatic dispatch interface module output 30 further comprises an audio output 34.

In various embodiments, the dispatch endpoint 8 is not voice activated (as discussed). Thus, the automatic dispatch interface module 10 may comprise a PTT controller 24 (push-to-talk controller 24) and the automatic dispatch interface module output 30 further comprises a PTT control line 32. The PTT controller 24 comprises a switch, transistor, relay and/or any other mechanism whereby the dispatch endpoint 8 may be instructed to begin transmitting so that the human readable indication provided by the automatic dispatch interface module output 30 may be transmitted by the dispatch endpoint 8.

In yet further instances, the automatic dispatch interface module 10 comprises cabling to interconnect the security system controller 12 to the dispatch endpoint 8 and omits one or more of the impedance matching or level conversion features herein described.

Figure 4:
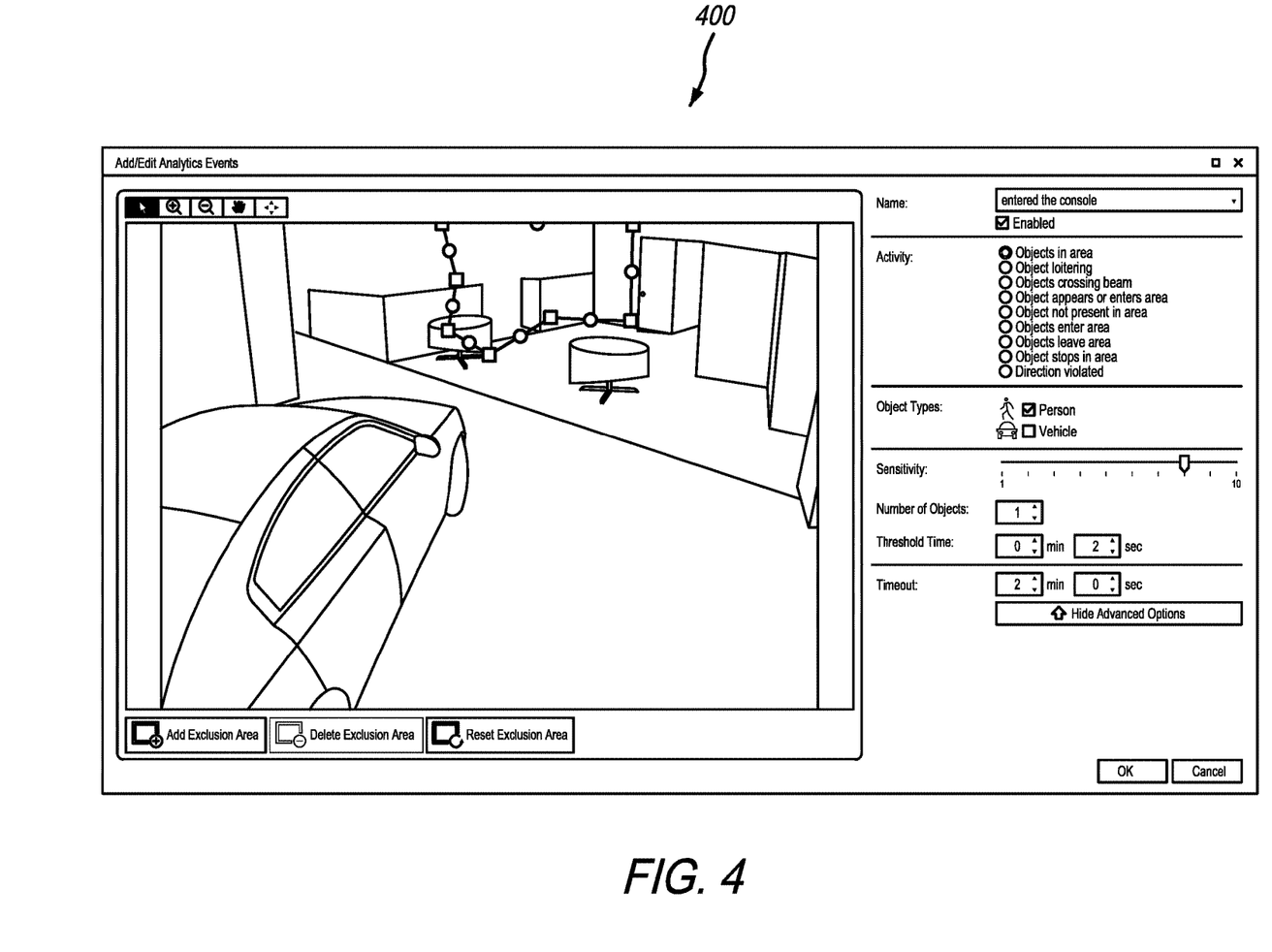
FIGS. 4 and 5 depict aspects of an example configuration interface of an automatic threat identification and response system, in accordance with various embodiments.
Figure 5:
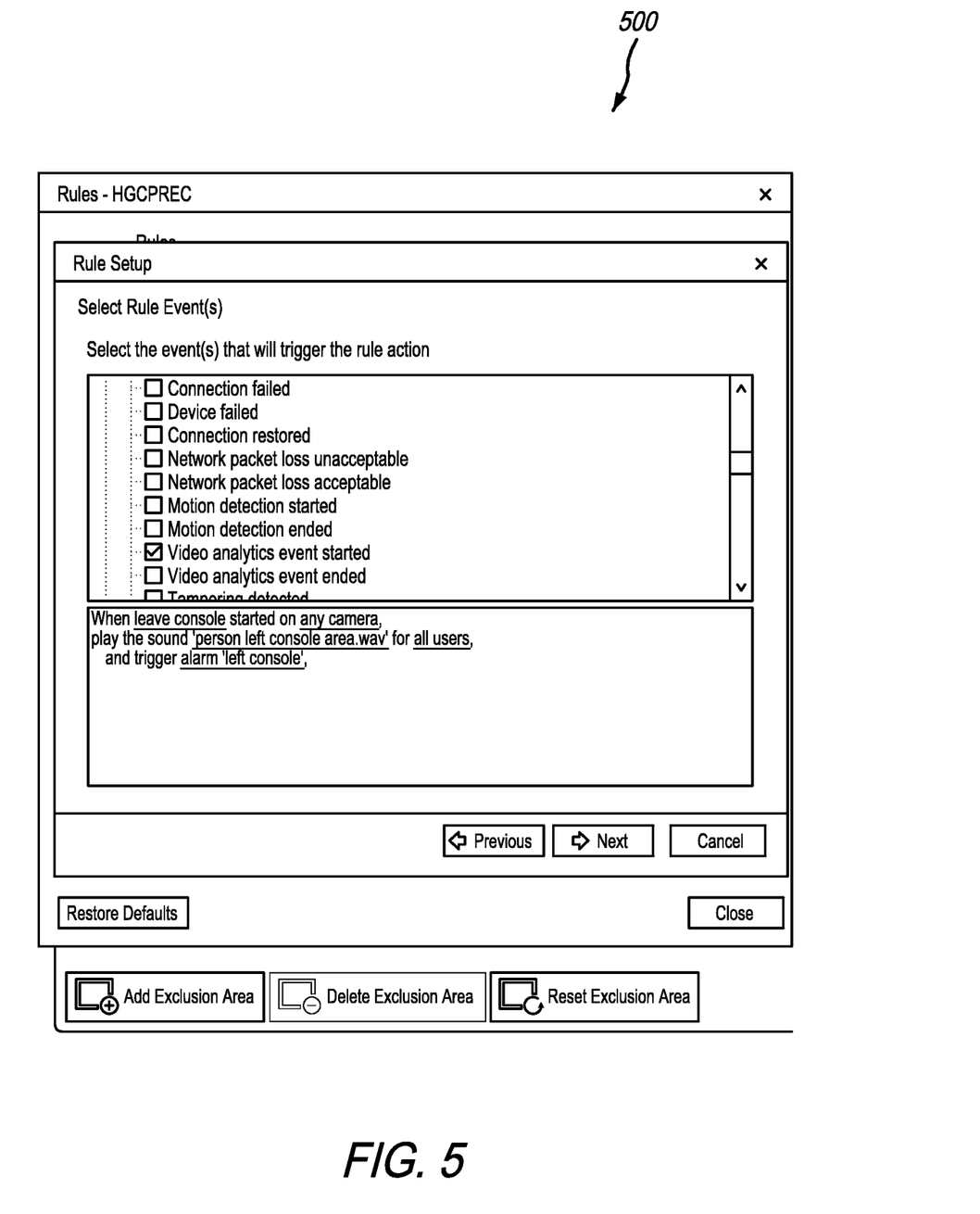

Having completed the discussion of FIGS. 1-3, attention is directed to FIG. 4 for a discussion of a first configuration screen 400 of the implementation of the security system controller 12. Configuration screen 400 depicts a user interface wherein a user may define the first incident so that the security system controller 12 and one or more anomaly detection module properly detect and classify various incidents. For example, configuration screen 400 shows that a user may select a region of a field of view of the anomaly detection module, which in this case is a camera, for monitoring, and further provides for different types of incidents that may trigger a generation of a first response token. With reference to FIG. 5, a second configuration screen 500 provides a facility for a user to set rules linking first response tokens to different sound files that are transmitted in response to different incidents.

Figure 6:
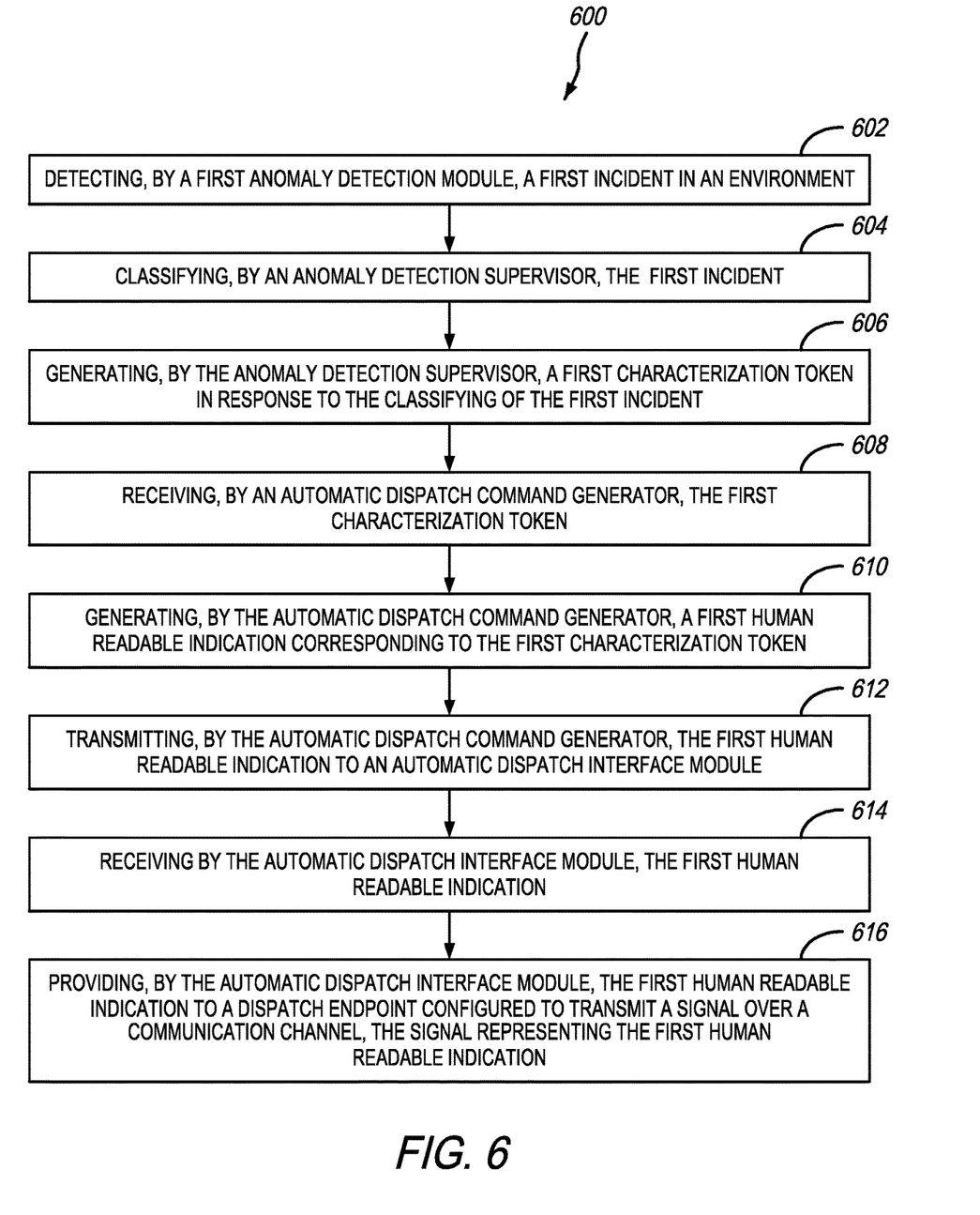
FIG. 6 depicts a method of automatic threat identification and response, in accordance with various embodiments.

Turning to FIG. 6, and with ongoing reference to FIGS. 1-5, in addition to the system 2 discussed above, a method of automatic threat identification and response 600 is also provided. For example, a method of automatic threat identification and response 600 may include detecting, by a first anomaly detection module 18, a first incident in an environment (block 602). An anomaly detection supervisor 14 may classify the first incident (block 604). The anomaly detection supervisor 14 also generates a first characterization token in response to the classifying of the first incident (block 606). An automatic dispatch command generator 16 receives the first characterization token from the anomaly detection supervisor 14 (block 608). The automatic dispatch command generator 16 generates a first human readable indication that corresponds to the first characterization token (block 610). In addition, the automatic dispatch command generator 16 transmits the first human readable indication to an automatic dispatch interface module 10 (block 612). The automatic dispatch interface module 10 receives the first human readable indication (block 614) and provides the first human readable indication to a dispatch endpoint 8 that is configured to transmit a signal over a communication channel 6, the signal representing the first human readable indication (block 616). Notably, in some instances the dispatch endpoint 8 is sound activated and transmits the signal in response to the first human readable indication comprising a sound corresponding to speech. Moreover, the first human readable indication may comprise a pre-recorded audio file comprising speech representative of the first characterization token. Finally, the dispatch endpoint 8 may be a radio transmitter and the communication channel 6 may be a public service radio frequency, possibly corresponding to at least one repeater. Thus, the method may be implemented so that law enforcement officers with portable devices may receive prompt dispatch notifications so they may respond to the first incident.

As used herein, the singular terms "a," "an," and "the" may include plural references unless the context clearly dictates otherwise. Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

Embodiments are envisioned where any of the aspects, features, component or steps herein may be omitted and/or are option. Furthermore, where appropriate any of these optional aspects, features, component or steps discussed herein in relation to one aspect of the invention may be applied to another aspect of the invention.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only exemplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of automatic threat identification and response, the method comprising:
   detecting, by a first anomaly detection module, a first incident in an environment, wherein the first anomaly detection module is operatively coupled to a security system controller;
   classifying, by an anomaly detection supervisor of the security system controller, the first incident;
   generating, by the anomaly detection supervisor, a first characterization token in response to the classifying of the first incident;
   receiving, by an automatic dispatch command generator of the security system controller, the first characterization token;
   generating, by the automatic dispatch command generator, a first human readable indication corresponding to the first characterization token;
   transmitting, by the automatic dispatch command generator, the first human readable indication to an automatic dispatch interface module;
   receiving, by the automatic dispatch interface module, the first human readable indication; and
   providing, by the automatic dispatch interface module, the first human readable indication to a dispatch endpoint configured to transmit a signal over a communication channel, the signal representing the first human readable indication,
   wherein a first portable device remotely disposed from the dispatch endpoint is configured to receive the signal from the communication channel and reproduce the first human readable indication in human readable form.

2. The method of automatic threat identification and response according to claim 1, wherein the dispatch endpoint is sound activated and transmits the signal in response to the first human readable indication comprising a sound corresponding to speech.

3. The method of automatic threat identification and response according to claim 1, wherein the first anomaly detection module comprises a security camera.

4. The method of automatic threat identification and response according to claim 1, wherein the first anomaly detection module comprises a dash camera of a law enforcement vehicle.

5. The method of automatic threat identification and response according to claim 1, wherein the first incident comprises an undesired movement within the environment.

6. The method of automatic threat identification and response according to claim 1, wherein the first characterization token corresponds to at least one of a direction of movement, a speed of movement, a classification of the movement as human, and a classification of the movement as non-human.

7. The method of automatic threat identification and response according to claim 1, wherein the first human readable indication comprises a pre-recorded audio file comprising speech representative of the first characterization token.

8. The method of automatic threat identification and response according to claim 1,
   wherein the dispatch endpoint comprises a radio transmitter and the communication channel comprises a public service radio frequency.

9. The method of automatic threat identification and response according to claim 1,
   wherein the dispatch endpoint comprises a radio transmitter and the communication channel comprises a public service radio frequency corresponding to at least one repeater.

10. The method of automatic threat identification and response according to claim 1,
    wherein the first portable device comprises a radio receiver operated by a law enforcement officer.

11. An automatic threat identification and response system comprising:
    a first anomaly detection module configured to detect a first incident in an environment;
    a security system controller operatively coupled to the first anomaly detection module and comprising:
       an anomaly detection supervisor configured to classify the first incident and generate a first characterization token representative of a classification of the first incident; and
       an automatic dispatch command generator configured to:
    (i) receive the first characterization token,
    (ii) generate a first human readable indication corresponding to the first characterization token, and
    (iii) transmit the first human readable indication to an automatic dispatch interface module;
       the automatic dispatch interface module comprising an interface configured to receive the first human readable indication and provide the first human readable indication to a dispatch endpoint; and the dispatch endpoint comprising a transmitter configured to transmit a signal over a communication channel, the signal representing the first human readable indication, wherein a first portable device remotely disposed from the dispatch endpoint is configured to receive the signal from the communication channel and reproduce the first human readable indication in human readable form.

* * * * *